United States Patent [19]

Pike

[11] Patent Number: 4,952,784
[45] Date of Patent: Aug. 28, 1990

[54] UNIT DRIVE ASSEMBLY

[75] Inventor: Timothy D. Pike, Castro Valley, Calif.

[73] Assignee: f.m.e. Corporation, Hayward, Calif.

[21] Appl. No.: 388,276

[22] Filed: Aug. 1, 1989

[51] Int. Cl.⁵ .............................................. G06F 1/00
[52] U.S. Cl. ........................................ 235/101; 74/63; 74/216.3; 101/91
[58] Field of Search .................. 235/101; 101/91, 92, 101/111; 74/63, 126, 84 R, 112, 640, 817, 216.3

[56] References Cited

U.S. PATENT DOCUMENTS

| | | | |
|---|---|---|---|
| 632,952 | 9/1899 | Tanner | 74/216.3 |
| 732,933 | 7/1903 | Follett | 74/126 |
| 868,316 | 10/1907 | Adler | 74/63 |
| 1,277,501 | 9/1918 | Stinner | 74/63 |
| 1,483,114 | 2/1924 | Root | 74/216.3 |
| 2,002,709 | 5/1935 | Niederhauser | 74/216.3 |
| 2,491,764 | 12/1949 | Quillen | 74/216.3 |
| 2,551,821 | 5/1951 | Bengtson | 74/216.3 |
| 2,734,604 | 2/1956 | Soave | 192/31 |
| 3,009,723 | 11/1961 | Patrignani | 292/33 |
| 3,018,665 | 1/1962 | Christoff | 74/99 R |
| 3,274,607 | 9/1966 | Muchow et al. | 235/101 X |
| 3,285,164 | 11/1966 | Malavazos | 101/91 |
| 3,969,945 | 7/1976 | Englund | 74/128 |
| 4,476,735 | 10/1984 | Cantwell | 74/84 R |
| 4,658,122 | 4/1987 | Payn et al. | 235/101 |
| 4,777,353 | 10/1988 | Hendrickson | 235/101 |

*Primary Examiner*—Benjamin R. Fuller
*Attorney, Agent, or Firm*—Townsend and Townsend

[57] ABSTRACT

A unit drive assembly (2; 84; 102) is used with postage meters (4) of the type which include a stationary base (6; 86; 104, 106) and moveably print head (8; 88; 108). The base and print head are mechanically connected so that input information to the base is mechanically transmitted to the print head. The assembly includes one or more drive tracks (10; 90; 110) along which a series of balls (16; 96; 112) are positioned. A first portion (12; 118; 120) of the drive track is carried by the base while a second portion (14; 116) is carried by the head. The first and second portions are aligned when the head is in the home position; it is at this time a ball drive (28; 42; 92; 102), carried by the base, moves the balls along the track discrete distances equal to one or more ball diameters. The head includes one or more print wheels (36) driven by the balls positioned along the second portion of the track so that the distances the print wheels rotate, which determines the value to be printed, depend upon the distances the balls are driven along the tracks.

12 Claims, 4 Drawing Sheets

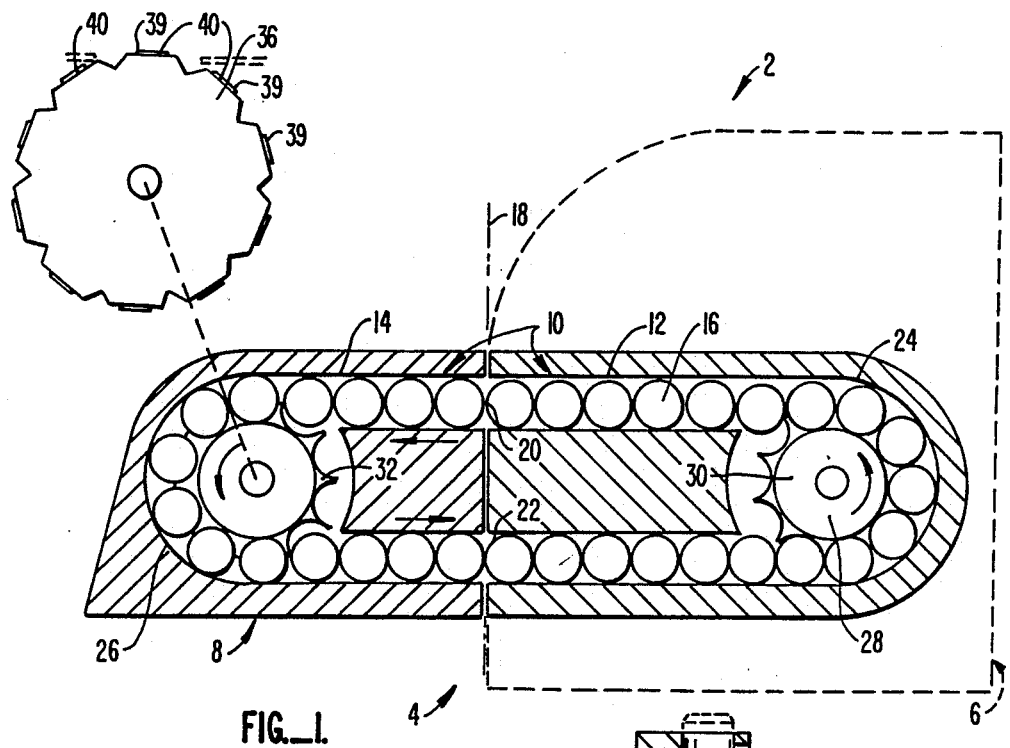
FIG._1.
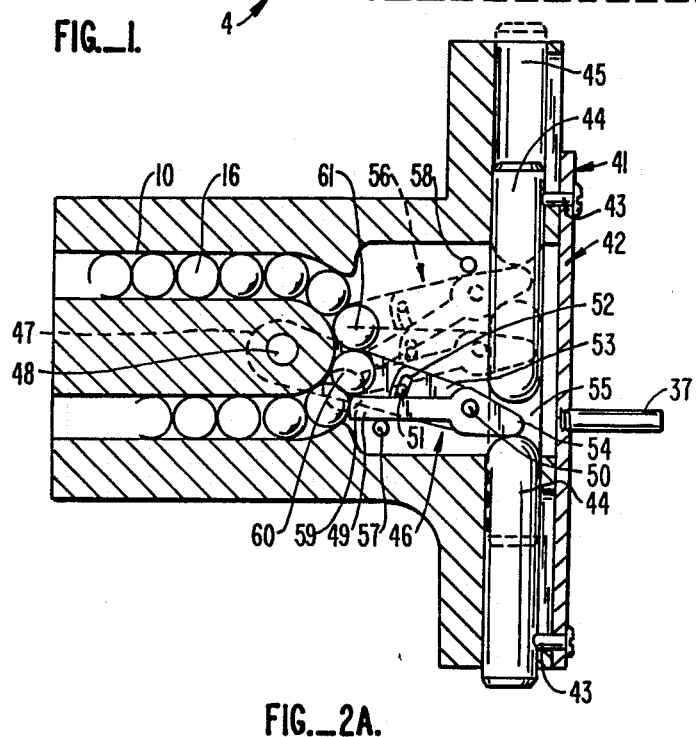
FIG._2A.

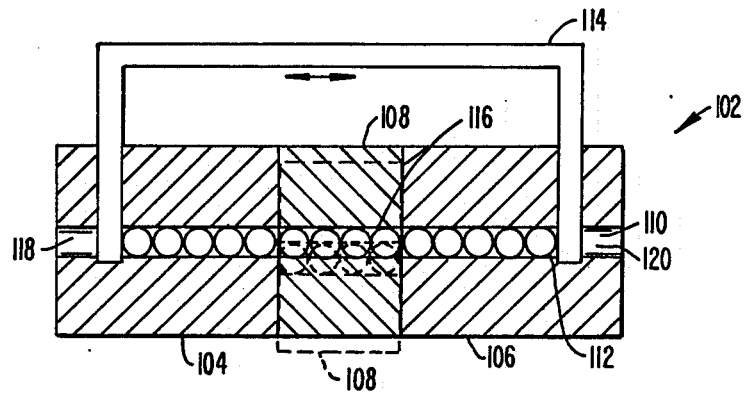
FIG._7.
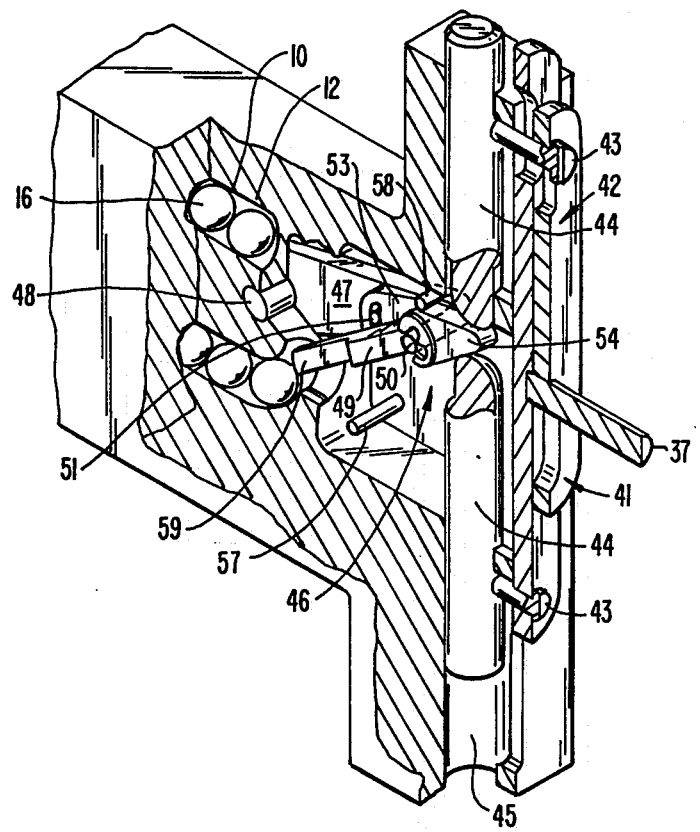
FIG._2B.

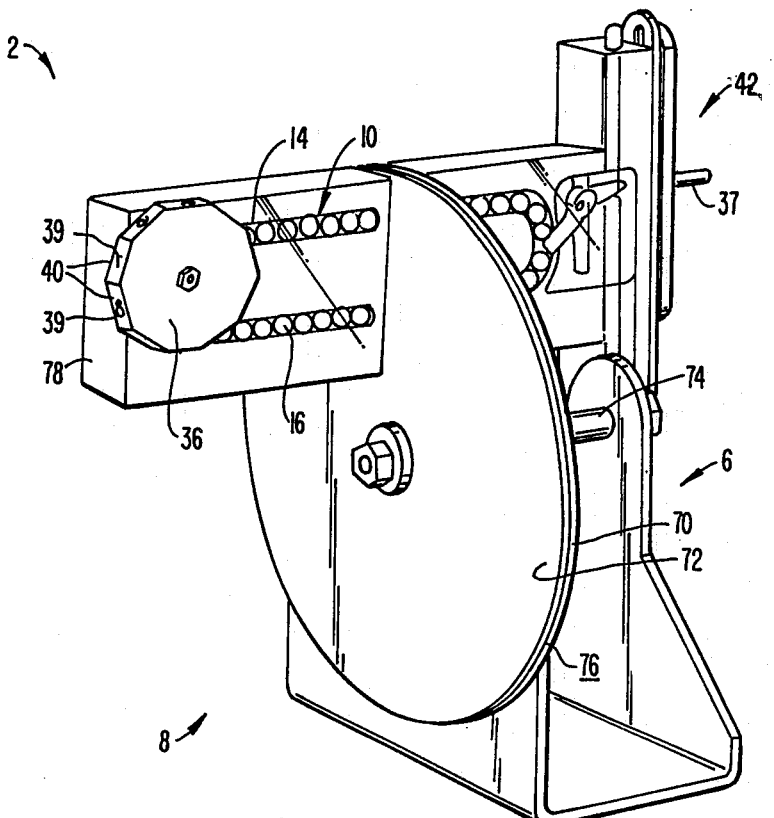
FIG._3.
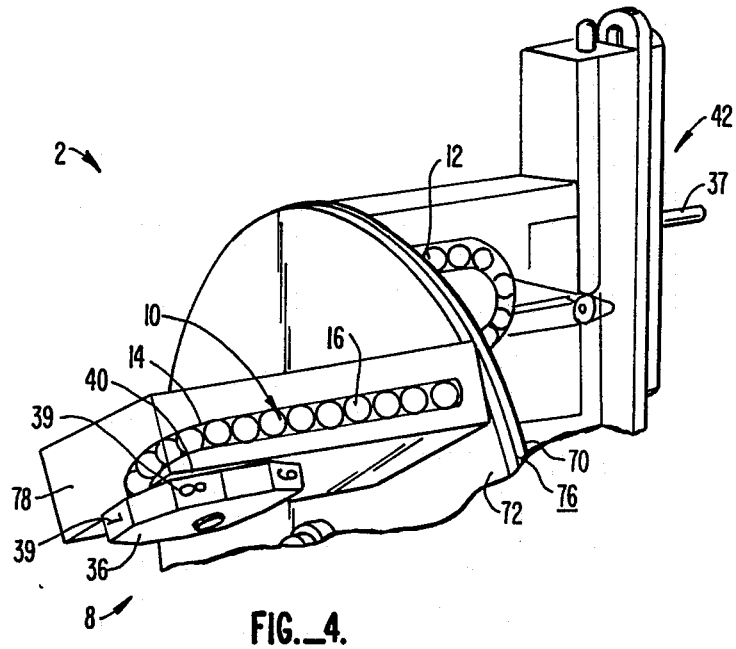
FIG._4.

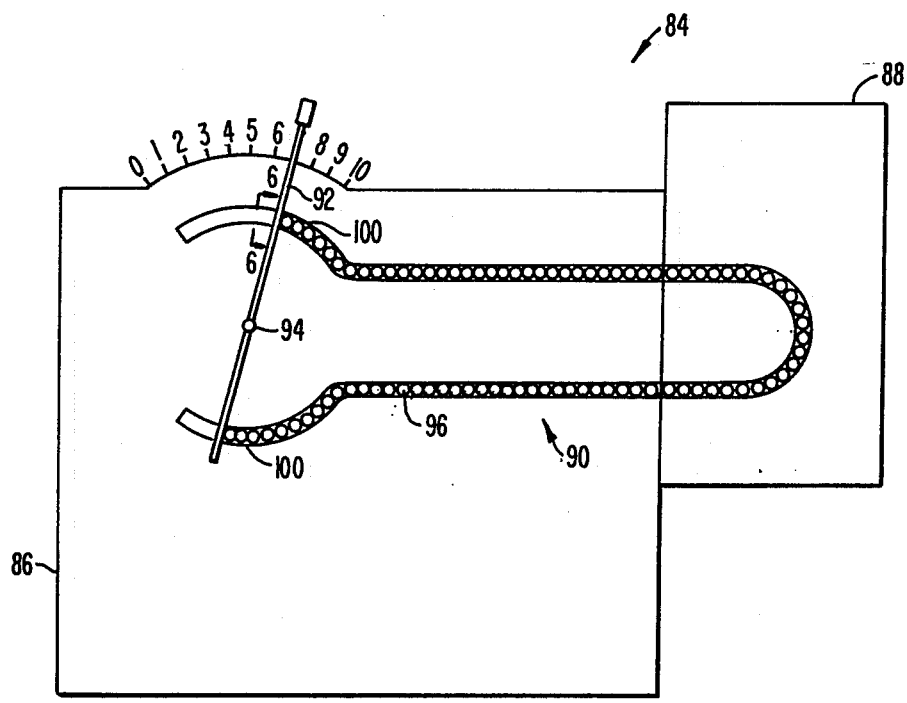
FIG._5.
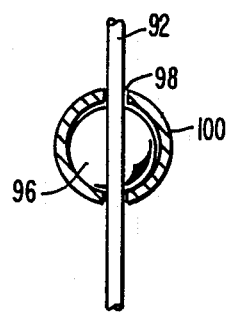
FIG._6.

UNIT DRIVE ASSEMBLY

BACKGROUND OF THE INVENTION

Postage meters, as well as other metering machines, typically include a stationary base and a rotatable print head. Information or instructions must be transferred from the stationary base to the moveable print head to position movable printing elements carried by the print head. The printing elements are typically in the form of print wheels having indicia about their peripheries. Each print wheel is rotated until the chosen indicium for that print element is properly positioned. The properly positioned print wheels provide the desired impression, such as the value of postage on a letter, when the print head is cycled one revolution.

Although many different ways have been devised to transmit information from a stationary element to a movable element, in some situations, such as in dealing with postage meters, security requirements limit the options. Specifically, with postage meters one needs a positive, anti-fraud linkage between the print head and the base. This is best achieved using a mechanical coupling between the elements together with anti-fraud elements. The anti-fraud elements are intended to prevent the movement of the printing element once the print head is moved from its home position unless the user damages the meter.

The mechanical linkage used in a conventional postage meter is shown in U.S. Pat. No. 4,658.122 issued on Apr. 14. 1987, the disclosure of which is incorporated by reference. That patent discloses an electro-mechanical meter in which the value to be printed is entered through a keyboard which causes a number of rods axially. The ends of the value rods extend into the print head and are connected to racks which engage gear teeth on the print wheels. The value rods rotate with the print head to provide the positive mechanical coupling between the base and the print head. Various types of anti-fraud measures intended to keep the unscrupulous user from rotating the print wheels after the print head has been moved from its home position have been devised. One is shown in U.S. Pat. No. 4,777,353 dated Oct. 11. 1988.

Although the mechanical couplings and interlocks devised to date do a very good job of securely transferring information from the base to the print head, there remains room for improvement on the basis of mechanical simplicity and anti-fraud integrity.

SUMMARY OF THE INVENTION

The present invention is directed to a unit drive assembly finding particular utility for use with machines, such as postage and other meters, in which first and second modules move relative to one another. The invention can also be used with other devices in which information is transmitted in discrete increments, such as parking meters, cash registers and combination locks. The invention provides for mechanically driving (or indexing) a driven element, such as a print wheel on a postage meter, while the modules, such as a base and a print head, are in a chosen relative orientation; when the modules are moved relative to one another away from that chosen orientation, the invention prohibits tampering with the driven element. Preferably the invention simultaneously insures the proper final positioning or alignment of the driven element when the modules are moved from their chosen relative orientation.

The unit (or indexing) drive assembly is advantageously preferably used with meters, such as postage meters which include a stationary base and a movable, typically rotating, print head. The print head includes operating elements which are mechanically connected so that input information to the base is mechanically transmitted from the base to the rotating head.

The unit drive assembly includes a drive track along which a series of discrete drive elements, such as balls, are positioned. A first portion of the drive track is carried by the base while a second portion is carried by the rotating head. The first and second portions are aligned with one another when the head is in the home position; a unit drive carried by the base moves the balls along the track discrete distances while the head is in the home position. The discrete distances are in multiples of the diameters of the balls. This is accomplished by appropriately sizing and positioning the drive track and by moving the balls distances equal to one, two, three etcetera ball diameters. The balls drive the print wheels in incremental amounts according to the indicia to be printed. Having the discrete distances being in multiples of the diameter also ensures that the plane between the print head and base, which bisects the drive track into the first and second portions, can be made to pass centrally between adjacent balls on opposite sides of the plane rather than through the middle of a ball to prevent a ball from becoming jammed between the print head and base.

One of the main advantages of the invention is that the drive elements are positively locked in position once the two modules move away from the home position (which creates a discontinuity along the drive track). The invention also facilitates the positional adjustment of the driven element once the modules move away from the home position by forcing the drive elements fully into the first portion of the drive track or the second portion of the drive track. That is, when used with a set of print wheels, moving the print head away from the home position can cause the balls in the tracks housed within the print head to be aligned very closely thus causing the print wheels to center on full indicia locations. This slight shifting of the print wheels removes any play in the drive element train so the impression printed is made with properly positioned indicia.

Another advantage of the invention accrues from using balls as the drive elements. The balls and the drive track are made to exhibit very low coefficients of rolling and sliding friction. Other drive elements, such as discs or rods, could also be used. Also. since, the drive tracks can be substantially enclosed, contamination of the drive tracks, such as from dust, ink and paper fibers, which can increase friction, can be minimized.

The unit drive can take a variety of forms. One unit drive includes a linear actuator to move a drive pawl which drives the drive elements one increment (typically one ball diameter) at a time: this creates a very simple, low cost drive which takes up little space. However, stepper motors or other such drives may be suitable as well.

Other features and advantages of the invention will appear from the following description in which the preferred embodiments have been set forth in detail in conjunction with the accompanying drawings.

BRIEF DESCRIPTION OF THE DRAWINGS

FIG. 1 is a schematic representation of a unit drive assembly made according to the invention used with a meter having a stationary base module and a rotatable print head module.

FIG. 2A shows a simplified view of a linear actuator drive for use as an alternative to the stepper motor drive of the embodiment of FIG. 1 with the drive at the end of a driving stroke.

FIG. 2B is an isometric view of the drive of FIG. 2A, with portions broken away for clarity, at the beginning of a driving stroke.

FIG. 3 is a perspective view of a working model of a unit drive assembly showing the operation of the invention with the print head module in the home position.

FIG. 4 is a partial view of the unit drive assembly of FIG. 3 showing the print head module rotated away from the home position to create a discontinuity in the drive track.

FIG. 5 is a schematic representation of an alternative embodiment of a unit drive assembly made according to the invention.

FIG. 6 is a cross-sectional view taken along line 6—6 of FIG. 5.

FIG. 7 is a schematic representation of a further alternative embodiment of a unit drive assembly made according to the invention.

DETAILED DESCRIPTION OF THE PREFERRED EMBODIMENTS

A unit drive assembly 2, shown in FIG. 1 in schematic form, is used with a postage meter 4 of the type including a stationary base module 6 and a rotatable print head module 8. The configuration of postage meter 4 is conventional and thus will not be described in detail.

Meter 4 includes a drive track 10 having a first portion 12 defined within base module 6 and a second portion 14 defined within print head module 8. Drive track 10 houses numerous steel balls 16 in a continuous loop. Drive track 10 is sized so that a plane 18, which separates print head module 8 from base module 6, passes through the points of contact 20, 22 of balls 16 on either side of plane 18. The purpose of this is discussed below.

Drive track 10 is preferably in the form of an enclosed tube with openings at its driving end 24 and its driven end 26. This helps to keep ink, paper particles, and other contaminants from drive track 10 to maintain low friction. A stepper motor drive 28 is mounted to base module 6 at driven end 24. The stepper motor drive 28 includes a scalloped ball drive sprocket 30 configured to engage the balls 16 at driven end 24 of drive track 10. Stepper motor 30 is preferably under conventional microprocessor control so to drive the series of balls 16 positioned along track 10 in preselected amounts. That is, stepper motor drive 28 rotates drive sprocket 30 sufficiently to move balls 16 along track 10 distances equal to one ball diameter, two ball diameters, three ball diameters, etc. Doing so causes balls 16 to move incremental amounts equal to their diameters and thus drive a ball driven sprocket 32 located at driven end 26 of drive track 10 like incremental amounts. The incremental drive also ensures that plane 18 passes between contact points 20, 22 of adjacent balls 16 to permit the rotation of print head module 8 without the interference of a mispositioned ball.

A print wheel 36 is mounted coaxially and integrally with sprocket 32 but is shown broken away in FIG. 1 to illustrate sprocket 32. Print wheel 36 carries indicia 39 at regularly spaced indicia positions 40 at its periphery. The various elements of unit drive assembly 2 are sized so that moving balls 16 one diameter along drive track 10 causes print wheel 36 to rotate one-tenth of a revolution because in the preferred embodiment print wheel 36 has ten indicia positions 40. Of course the sizes of the various components could be adjusted to require the balls 16 to move more than one ball diameter (preferably two, three, etc. ball diameters) to drive print wheel 36 one indicia position.

The embodiment of FIG. 1 shows the use of stepper motor drive 28 as the drive unit for driving balls 16. In some circumstances it may be desirable to use a unit drive other than stepper motor drive 28. FIGS. 2A and 2B show, in simplified form, a hand-operated linear actuator drive 42, which could be driven by a solenoid (not shown). Drive 42 includes a pair of drive pins 44, coupled to the solenoid through mounting screws 43 extending from a drive plate assembly 41, which move in a reciprocal manner along an elongate path 45. (The embodiment of drive 42 illustrated is intended for demonstration purposes and includes a handle 37 by which drive 42 is actuated.) Drive 42 also includes a pawl assembly 46 having a pivot bar 47 pivotably mounted to pivot pin 48 at one end of bar 47. A pawl 49 is pivotably mounted to the other end of pivot bar 47 by a pin 50 for pivotal movement parallel to the plane of movement of pivot bar 47. The pivotal movement of pawl 49 relative to pivot bar 47 is limited by a pin 51 engaging a slot 52 within an integral pawl extension 53.

One end 54 of pawl 49 is positioned between the opposed semi-spherical ends of drive pins 44 so that reciprocal movement of pins 44 cause pawl assembly 46 to move between the solid line position 55 of FIG. 2A and the position 56 of FIG. 2B. The solid line position 55 of FIG. 2A shows pawl 48 at its rest position following one indexing movement. It should be noted that stops 57. 58 can be used to position pawl 48 at each end of a stroke of actuator drive 42. However, stops 57. 58 may not always be required.

Movement of drive pins 44 upwardly in FIG. 2A causes pawl 49 to pivot upwardly from position 55 to position 56. Stop 58 helps to properly position the tip 59 of pawl 49 at the position shown in FIG. 2A adjacent a drive ball 60. Movement of drive pins 44 downwardly in FIG. 2B drives next ball 61, and consequently all the other balls 16, one diameter along track 10. This movement of pawl 49 to position 55 is partially determined by a stop 57.

It should be noted that during driving motion tip 59 is somewhat captured between a next ball 61 and the underlying drive ball 60 so that the downward movement of drive pins 44 causes tip 59 to force drive ball 60 around track 10. However, during the upward movement of drive pins 44, tip 59 of pawl 49 slides over the outside of drive ball 60, which has moved down one position so that next ball 61 occupies the position previously occupied by ball 60. The repositioning of pawl 49 during the upward stroke is achieved without springs or other active biasing members but rather simply through the inertia of pawl 49.

Linear actuator drive 42 has been described with reference to the directions up, down, etc. However, this is for convenience only since drive 42 may be used in any orientation.

One of the advantages of linear actuator drive 42 over stepper motor drive 28 is that it can be used with inexpensive solenoid drives rather than the relatively expensive stepper motors used with drive 28. Using the inertia of pawl 48, along with stops 57, 58 as needed, no extraneous springs or other biasing elements need be used with drive 42. Linear actuator drive 42 provides a positive action limiting the motion of balls 16 to one step at a time. Linear actuator drives can be made relatively small with parts having low inertia to permit high speed operation with a low current draw.

Referring now to FIGS. 3 and 4, a simplified drawing of a prototype unit incorporating the present inventive concept is disclosed. Therefore, similar elements will include like reference numerals. This unit is a two-to-one model of a working meter. The linear actuator drive 42 of FIGS. 2A and 2B is used in the prototype instead of stepper motor drive 28 of FIG. 1.

The interface between base module 6 and print head module 8 is represented by two plates 70, 72 mounted coaxially to a shaft 74 and defining plane 18 (referred to only in FIG. 1) by the abutting faces 76 of the two plates. Base plate 70 acts as part of base module 6 and is thus stationary. Plate 70 has two holes (not shown) which define part of drive track 10. Print head plate 72 is free to rotate about shaft 74 carrying with it second portion 14 of drive track 10 (defined within a block 78 of clear plastic to show internal details) and print wheel 36 therewith. Of course in a working embodiment several sets of tracks and print wheels will usually be used. Print head plate 72 also has two holes (not shown) defining a short distance of drive track 10 adjacent abutting faces 76.

The embodiment of FIG. 3 represents the home position for print head module 8. It is at the home position changes to the rotary orientation of one or more print wheels 36 (only one of which is shown for clarity) are changed according to the postage value (or other indicia) to be printed. Once set, print head module 8 can be rotated 360° during a print cycle. As suggested in FIG. 4, once print head module 8 is rotated away from the home position of FIG. 3, first and second portions 12, 14 of drive track 10 are no longer aligned. For this to occur without interference from balls 16, it is preferred that the apparatus be sized so that points 20, 22 of the balls are at plane 18 (see FIG. 1) so that relative movement of plates 70, 72 is not hindered by balls 16. However, slight misalignment of balls 16 along track 10 is self correcting by rotation of print head module 8 since the two plates 70, 72 will force the incorrectly positioned balls 16, assuming that the incorrect positioning is of a minor amount, back into general alignment with plane 18. This helps to ensure that print wheel 36 is properly positioned during a print cycle: when print head module 8 is away from the home position of FIG. 3, balls 16 along second portion 14 of drive track 10 are effectively locked in position, thus locking print wheel 36 in position as well, by the sealing action of plates 70, 72. The invention thus provides inherent positional locking of the driven element, in the preferred embodiment print wheel 36, as soon as print head module 8 has left the home position. Only by destroying a portion of the print head module 8 could print wheel 36 be rotated once the print head module has left the home position: such tampering would become quite apparent for added security.

The present invention could incorporate a ball track which is not a continuous loop. One way to achieve this is shown schematically in FIG. 5. Unit drive assembly 84, used with a stationary module 86 and a movable module 88, includes a U-shaped track 90 and a manually operated unit driver 92 pivotable about a point 94. Driver 92 engages balls 96 and drives the balls along tack 90 according to the angular position of driver 92. Track 90 is a non-continuous, recirculating track. Preferably driver 92 would be detented to ensure balls 96 are driven discrete distances, preferably a multiple of ball diameters. As shown in FIG. 6, driver 92 passes through slots 98 formed in curved track segments 100 to engage balls 96. By making the shape of curved track segments 98 circular, driver 92 is moved equal rotary distances for each ball diameter driven.

FIG. 7 shows in schematic form, a further embodiment of the invention. Unit drive assembly 102 includes first and second stationary modules 104, 106 on either side of a moveable module 108. Modules 104, 106, 108 define a non-continuous, non-recirculating path 110 along which balls 112 are positioned. Module 108 is shown in its operational position aligned with modules 104, 106. Balls 112 are indexed along path 110 by a linear driver 114 so long as modules 104, 106, 108 are aligned with path 110 continuous. Moving module 108 in a rectilinear fashion to the dashed lined position in FIG. 7 causes central portion 116 of path 110 carried by module 108, to become misaligned with the outer portions 118, 120 of path 110, carried by modules 104, 106. This locks the balls 112 within portion 116 of path 110 in place. One or more operating elements (not shown) carried by module 108 and responsive to the movement of balls 112 along central portion 116 will then be fixed so long as module 108 is out of alignment with modules 104, 106. Although the embodiment of FIG. 7 is shown using linear driver 114, portions 118 and 120 of path 110 could be modified to accommodate a rotary drive instead.

It should be noted that in each of the embodiments the balls are locked in place by a seal (such as plates 70, 72) once the modules are moved to interrupt the ball track. This fixes the position of both the driving elements and the driven elements to greatly reduce the possibility of tampering. The resulting structure is essentially non-corruptible.

Other modification and variation can be made to the disclosed embodiments without departing from the subject of the invention as defined in the following claims. For example, the invention could be used when the two modules are separated from one another. In such case the modules would need some type of automatically actuated cover for sealing the open ends of the track segments to keep the balls in place.

What is claimed is:

1. A unit drive assembly for use with a device having first and second modules movable relative to one another between at least first and second relative orientations, the unit drive comprising:
   a drive track including a first portion carried by the first module and a second portion carried by the second module, the first and second portions aligned with one another when the first and second modules are at the first orientation and misaligned with one another when the first and second modules are at the second orientation;
   a plurality of drive elements movably positioned along the drive track;
   a drive track seal positionable to retain drive elements within the first and second portions when the first and second portions are at the second orientation;

a driver, carried by the first module, operable to drive the drive elements along the drive track when the first and second portions of the drive track are aligned: and a driven element, carried by the second module, operably coupled to at least one of the drive elements positioned along the second portion of the drive track, so that the driven element is driven in an amount corresponding to a distance which the at least one of the drive elements is driven along the drive track.

2. The assembly of claim 1 wherein the drive is a unit drive adapted to drive the drive elements along the drive track discrete, incremental distances so the driven element is driven in corresponding discrete, incremental amounts.

3. The assembly of claim 1 wherein the drive track forms a continuous loop.

4. The assembly of claim 1 wherein the drive track includes tube portions.

5. The assembly of claim 1 wherein the drive elements are spherical.

6. The assembly of claim 2 wherein the drive elements have a uniform drive track dimension measured parallel to the drive track.

7. The assembly of claim 6 wherein the discrete distances are integer multiples of the drive track dimension.

8. The assembly of claim 1 wherein the driver includes a drive pawl reciprocally driven by a linear actuator.

9. The assembly of claim 1 wherein the driver includes a stepper motor drive.

10. The assembly of claim 1 wherein the driven element includes a rotatable element having a periphery, the rotatable element carrying indicia at the periphery.

11. The assembly of claim 1 wherein the incremental amounts are angular amounts.

12. A unit drive assembly for use with a metering unit having a rotating printing head and a stationary base, the head including at least one movable print element with printing indicia so that when the head is rotated from a temporarily stationary, home position, a chosen indicium makes an impression on a suitable printing medium when the printing head is rotated through one revolution from the home position, the unit drive assembly comprising;

a drive track including a first portion carried by the base and a second portion carried by the printing head, the first and second portions aligned with one another when the printing head is at the home position and misaligned with one another when the printing head is rotated away from the home position:

a plurality of drive elements movably positioned along the drive track, the drive elements having a uniform drive track dimension measured parallel to the drive track:

a unit drive, carried by the base, operable to drive the drive elements along the drive track discrete distances when the first and second portions of the drive track are aligned, the discrete distances being integer multiples of the drive track dimension;

a driven element, carried by the printing head, operably coupled to the drive elements and positioned along the second portion of the drive track, so that the driven element is driven in incremental amounts corresponding to the discrete distances which the drive elements are driven along the drive track: and a drive track seal positionable to retain the drive elements within the first and second portions of the drive track when the printing head is at positions other than the home position.

* * * * *